United States Patent [19]

Schumacher et al.

[11] Patent Number: 4,635,415
[45] Date of Patent: Jan. 13, 1987

[54] GLASS PANE GLUED INTO THE FRAME OF AN AUTOMOBILE BODY BY MEANS OF AN ELASTOMERIC POLYMERIZED ADHESIVE

[75] Inventors: Rolf Schumacher, Sindelfingen; Heinz Faix, Gechingen; Ulrich Bruhnke, Ehningen, all of Fed. Rep. of Germany

[73] Assignee: Daimler-Benz Aktiengesellschaft, Stuttgart, Fed. Rep. of Germany

[21] Appl. No.: 818,333

[22] Filed: Jan. 13, 1986

[30] Foreign Application Priority Data

Jan. 18, 1985 [DE] Fed. Rep. of Germany ....... 3501490

[51] Int. Cl.⁴ .............................................. E06B 3/00
[52] U.S. Cl. ...................................... 52/127.1; 52/208; 156/273.9; 156/344
[58] Field of Search ............ 52/208, 99, 173 R, 127.1; 156/344, 108, 254, 273.9; 49/464

[56] References Cited

U.S. PATENT DOCUMENTS

| | | | |
|---|---|---|---|
| 3,574,024 | 4/1971 | Rose | 156/108 |
| 4,059,469 | 11/1977 | Mattimoe et al. | 156/108 |
| 4,184,000 | 1/1980 | Denman | 156/273.9 X |
| 4,481,059 | 11/1984 | Steck | 156/254 |
| 4,555,607 | 11/1985 | Roentgen et al. | 219/10.57 X |
| 4,571,278 | 2/1986 | Kunert | 52/208 X |
| 4,581,276 | 4/1986 | Kunert et al. | 156/108 X |

*Primary Examiner*—Carl D. Freidman
*Attorney, Agent, or Firm*—Craig & Burns

[57] ABSTRACT

A glass pane adhesively fastened in the frame of an automobile body by means of an elastomeric polymerized adhesive, which is provided on its surface within the adhesive area with a conductor strip provided with electrical connections that on its side facing the adhesive carries a separating layer of a thermally meltable or fusible material such as soft solder or thermoplastic. For purposes of disassembly of the pane, a current is caused to flow through the conductor strip so that the conductor strip heats up, the separating layer melts and the pane can be disassembled without difficulties.

14 Claims, 1 Drawing Figure

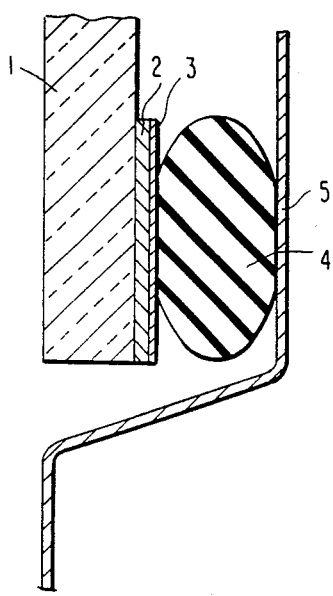

GLASS PANE GLUED INTO THE FRAME OF AN AUTOMOBILE BODY BY MEANS OF AN ELASTOMERIC POLYMERIZED ADHESIVE

In modern automobiles, direct glazing methods are used to an ever-increasing extent, i.e., the windowpanes are directly glued or bonded to the body by means of an adhesive. The advantages of an adhesively fastened glass pane consist in particular in that an adhesively fastened glass pane can provide further contributions to the stability of the body. By reason of their excellent properties, such types of adhesives are used as adhesive material for gluing or bonding the pane to the frame which polymerize or cross-link during the hardening and form an elastomeric adhesive layer. Such adhesives are, for example, the two-component or the single-component polyurethane adhesives or polysulfide adhesives hardening in the humidity of the air which are frequently used in the automotive industry for bonding or adhesively fastening windshields.

However, it is disadvantageous with these adhesives that they harden irreversibly which means that in case of a breakage of the glass pane or in case of a body repair, in connection with which the glass pane has to be removed, to simple possibility exists for opening up the connection between body and pane so that the adhesive layer has to be mechanically cut up in a tedious manual operation for the removal of the glass pane, respectively, glass pane remainders because the adhesive layer is accessible only with extraordinary difficulty as a result of the glass layer covering the same.

The principal object of the present invention therefore resides in finding a glass pane glued or bonded into the frame of a car body by means of an elastomeric polymerized adhesive, which is easily interchangeable in case of need.

The underlying problems are solved according to the present invention in that the glass pane carries on its surface within the adhesive area an electric conductor strip provided with electrical connections, in that the adhesive is an irreversibly hardening, cross-linked elastomeric adhesive and in that the conductive strip is coated on its side facing the adhesive with a separating layer made of a thermally fusible material.

The conductor strip with the separating layer disposed thereon is to be as wide as or slightly wider than the width of the adhesive layer in order to prevent reliably that the adhesive reaches the non-coated pane and forms thereat a non-detachable connection. The separating layer may consist of any desired material adapted to be melted by heat; it is preferred to make the separating layer of a metallic soft solder or of a layer of a thermoplastic. The melting point of the layers is to be so selected that the layers can melt without excessive heating, however, the melting point is not to be so low that it melts or becomes soft at the high temperatures occasionally occurring in the automobile. Metallic soft solders are preferred which have a melting point between 140° C. and 200° C., for example, a soft solder on the basis of tin/lead (LSn 60) which has a minimum melting point of about 185° C. If one utilizes soft solders with higher melting temperature, then during the melting of the solder, damage may occur in compound glass panes to the organic compound layer disposed between the glass panes. This would not be of any further problem if it involves the removal of a defective glass pane; if, however, it is of interest to be able to disassemble also intact glass panes, then it is necessary to utilize a separating layer with lower melting temperature. Separating layers which consist of a metallic solder are particularly preferred because the adhesive develops a particularly high retention force on such metallic solder and the connection between adhesive and pane is therefore particularly safe. The application of the metallic separating layer on the conductor strip takes place according to conventional methods, for example, by imprinting and melting, galvanic separation, evaporation, flame-spraying or sintering of a corresponding metal powder.

However, it is also possible to arrange an organic separating layer on the conductor strip, for example, in that one coats the conductor strip with an organic substance dissolved in a corresponding solvent. All substances compatible with the adhesive and melting under the influence of heat can be used as organic separating layer whereby under the term "compatible with the adhesive" is understood in particular that the adhesive still develops a satisfactory adhesive force on the separating layer. Such thermoplastic separating layers are preferred which possess a melting temperature between 140° and 200° C. If the melting temperature is too low, then there exists the danger with some thermoplastics particularly in hot summers of the cold flow in the separating layer which may lead to damages; if the melting temperature is too high, then what was said hereinabove for metallic separating layers also applies to thermoplastic separating layers.

It may be advantageous in some circumstances to improve the adhesion between separating layer and adhesive by interposition of an adhesion promoter. Such a layer may be of organic nature, for example, a "primer" or an adhesion promoter paint, however, it may also be of metallic nature, for example, of a thin layer of copper, nickel, iron or the like separated or precipitated, for example, galvanically or without current. Metallic adhesion promoting layers are suitable in particular for metallic separating layers, as to the rest, the selection of an adhesion promoter depends on the nature of the adhesive and separating layer and can be readily determined by a person skilled in the art on the basis of his experience.

The electric conductor strip disposed on the pane underneath the separating layer can be applied on the glass pane in a known conventional manner, for example, particularly advantageously according to those methods, according to which electrically heatable rear windows are also provided with conductive strips. Customarily, one utilizes for that purpose, for example, conductive burn-in pastes applied by means of screen printing which are burned into the glass pane or melted on the same in a separate process step or in the course of the manufacture of the pane. It is additionally possible also to apply the electric conductor strip on the glass pane as adhesively coated metal band whereby the adhesive effect of the adhesive can be enhanced possibly by a heat treatment. The conductor strip is additionally provided with electrical connections, by way of which a current can be conducted through the conductor strip. The conductor strip heats up under the influence of the current and causes the separating layer to melt. The conductor strip can thereby consist of an endless ring-shaped conductor which is provided at two mutually opposite sides with electrical connections, however, it is also possible with an interrupted conductor strip to arrange the current connections at both ends of the conductor strip. The fastening of the current connections at the conductor strip takes place according to the processes known in connection with the manufacture of heatable rear windows, for example, by soldering thereto a corresponding contact plate whereby, however, of course, attention must be paid that the solder, by means of which the electrical connections are fastened on the conductor strip, has a considerably higher melting point than the separating layer in order to avoid an unintentioned disengagement of the current connection from the conductor strip during the heat-up of the conductor strip. In addition to resistance heating, the conductor strip may also be heated, for example, by inductive heating. The conductor strip can additionally consist directly of a low melting solder so that it combines in itself the properties of conductor strip and separating layer. With thermoplastic separating layers, it is furthermore possible to heat up the separating layer dielectrically in that one connects with a high frequency voltage source the conductor strip as one electrode and the frame in which the glass pane is glued-in, as other electrode. Furthermore, it would also be possible, for example, with compound glass panes, to include the conductor strip in the intermediate layer between the two outer glass panes and to apply the separating layer directly on the glass pane surface, however, such a construction is connected with considerably higher costs in the manufacture.

These and other objects, features and advantages of the present invention will become more apparent from the following description when taken in connection with the accompanying drawing, which shows, for purposes of illustration only, one embodiment in accordance with the present invention, and wherein:

The single FIGURE is a somewhat schematic cross-sectional view through one embodiment in accordance with the present invention illustrating the glass pane adhesively connected with the body frame.

Referring now to the single FIGURE of the drawing which shows a partial cross section through a glass pane adhesively fastened in a frame, the individual layers are not shown true to scale. The electrical conductive layer 2 which is applied on the glass pane 1 is covered off by the separating layer 3. The windowpane is connected with the body panel 5 (window frame) by means of the adhesive layer 4 by way of the separating layer 3. The thickness of the adhesive layer is thereby appropriately so selected that body tolerances can be compensated therewith. The width of the conductive layer as well as of the separating layer must be so selected that a contact of the adhesive layer with the windowpane 1 is reliably avoided.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to encompass all such changes and modifications as are within the scope of the appended claims.

We claim:

1. A glass pane adhesively secured in the frame of an automobile body by means of an adhesive, said pane carrying on its surface within the adhesive area an electrical conductor strip means provided with electrical connecting means, the adhesive being an irreversibly hardening cross-linked elastomeric adhesive, and the conductor strip means being coated on its side facing the adhesive with a separating layer means made from a thermally fusible material.

2. A pane according to claim 1, wherein the width of the conductor strip provided with the separating layer means is at least substantially equal to the width of the adhesive layer.

3. A pane according to claim 2, wherein the width of the conductor strip means is slightly larger than the width of the adhesive layer.

4. A pane according to claim 2, wherein the separating layer means consists of a metallic soft solder.

5. A pane according to claim 4, wherein the soft solder has a melting temperature between about 140° C. and about 200° C.

6. A pane according to claim 5, wherein the separating layer means is provided with a layer of an adhesion promoter between separating layer means and adhesive.

7. A pane according to claim 2, wherein the separating layer means consists of a thermoplastic material compatible with the adhesive.

8. A pane according to claim 7, wherein the thermoplastic material has a melting temperature between about 140° C. and about 200° C.

9. A pane according to claim 8, wherein the separating layer means is provided with a layer of an adhesion promoter between separating layer means and adhesive.

10. A pane according to claim 2, wherein the separating layer means is provided with a layer of an adhesion promoter between separating layer means and adhesive.

11. A pane according to claim 1, wherein the separating layer means consists of a metallic soft solder.

12. A pane according to claim 11, wherein the soft solder has a melting temperature between about 140° C. and about 200° C.

13. A pane according to claim 1, wherein the separating layer means consists of a thermoplastic material compatible with the adhesive.

14. A pane according to claim 13, wherein the thermoplastic material has a melting temperature between about 140° C. and about 200° C.

* * * * *